April 23, 1963 A. A. KUCHER 3,086,479
LEVACAR GUIDANCE SYSTEM
Filed Dec. 28, 1961 3 Sheets-Sheet 3
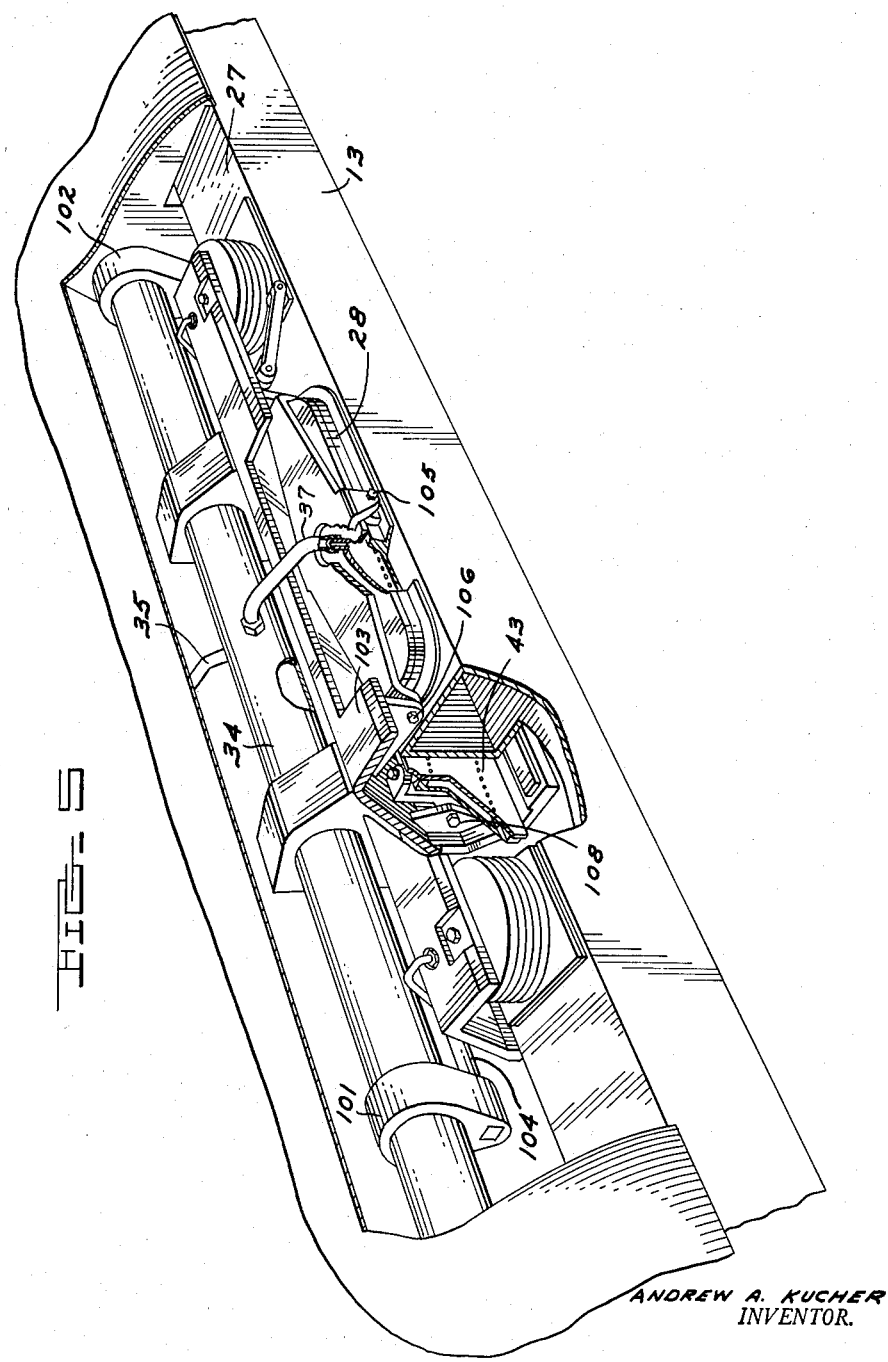
ANDREW A. KUCHER
INVENTOR.
BY
John R. Faulkner
Keith L. Zirschling
ATTORNEYS

United States Patent Office 3,086,479
Patented Apr. 23, 1963

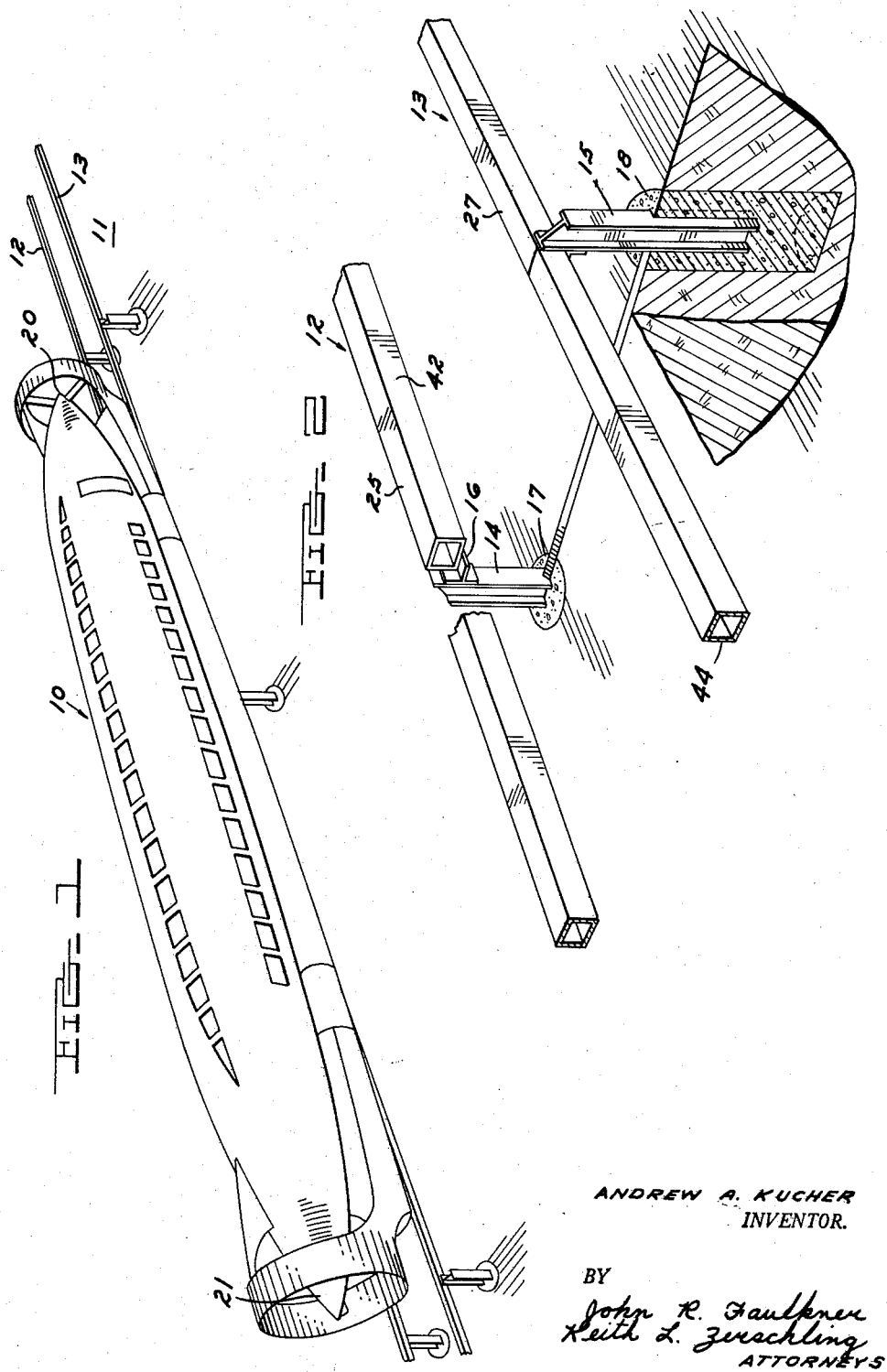

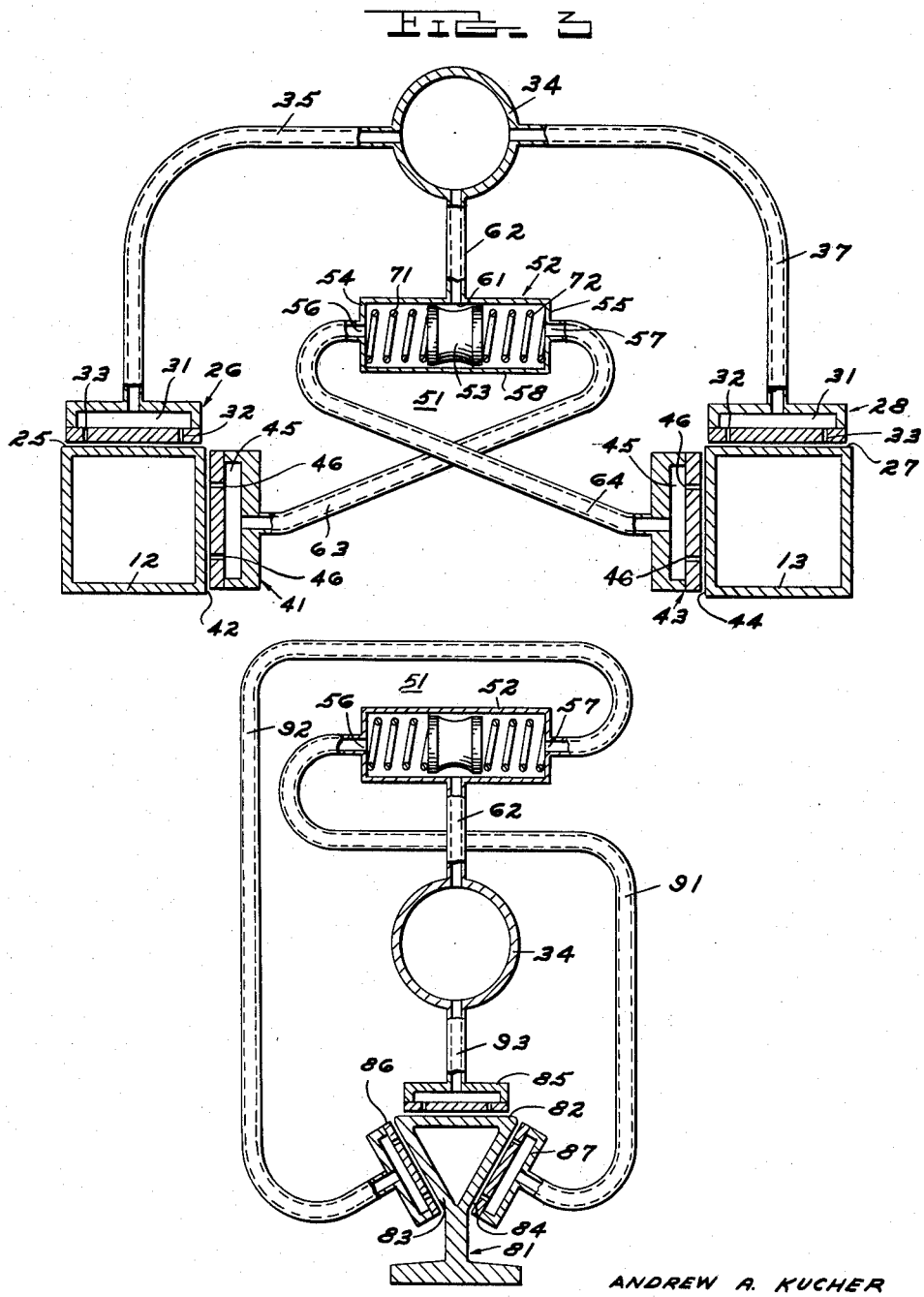

3,086,479
LEVACAR GUIDANCE SYSTEM
Andrew A. Kucher, Dearborn, Mich., assignor to Ford Motor Company, Dearborn, Mich., a corporation of Delaware
Filed Dec. 28, 1961, Ser. No. 162,870
8 Claims. (Cl. 104—134)

This invention relates to a vehicle supported from a rail system by means of gas under pressure and more particularly to means in such a vehicle for controlling or restricting its lateral movment.

In a copending application Serial No. 765,114, filed October 3, 1958, in the names of David J. Jay and Harlan W. Peithman, and assigned to the assignee of this invention, there is disclosed a high speed transportation system in which a vehicle is supported from surfaces, preferably a rail system, by means of gas pressure levitation devices that supply a thin film of gas under pressure between the devices and the tops of the rails. Gas pressure levitation devices are also positioned in opposed relationship to the side surfaces of the rails. A full supply of gas under pressure is continuously fed to these gas pressure levitation devices to continuously supply a thin film of gas under pressure between these devices and the sides of the rails to control or restrict the lateral movement of the vehicle.

In the mechanism provided by this invention, a full supply of gas is fed only to the gas pressure levitation devices positioned in opposed relationship to one side of the rail when lateral forces applied to the vehicle are not in balance. When the lateral forces are in balance, a condition of neutral side loading, the mechanism cuts off or substantially reduces the supply of gas to all the levapads positioned in opposed relationship to the side portions of the rail system. When the lateral forces are applied to the vehicle, for example, by centrifugal forces created in a turn, the mechanism substantially increases the supply of gas under pressure to those gas pressure levitation devices which are active in resisting these lateral forces. The present invention thus results in a saving in gas under pressure that is needed to control the lateral movement of the vehicle.

In the preferred embodiment of the invention, an inertia type valve is connected to a supply of air under pressure. This inertia type valve includes a shuttle piston that restricts air flow through the valve during times of neutral side loading. The shuttle piston will move to one side or the other during times that lateral forces are applied to the vehicle, thereby increasing the air supply to the gas pressure levitation devices positioned in opposed relationship to one of the surfaces, and that are employed in resisting these lateral forces.

An object of the invention is to provide a means for controlling the lateral movements of a vehicle supported from a rail system by means of gas under pressure.

Another object of the invention is the provision of a means for controlling the lateral movement of a vehicle supported from a rail system by means of gas under pressure which employs gas under pressure selectively supplied to resist lateral movement in either direction.

A further object of the invention is the provision of a means for controlling the lateral movement of a vehicle supported on a rail system by means of gas under pressure which increases the supply of gas to gas pressure levitation devices active in resisting a lateral force applied to the vehicle.

Other objects and attendant advantages of the present invention will become more fully apparent as the specification is considered in connection with the attached drawings in which, FIG. 1 is a perspective view of the vehicle and rail system of the present invention;
FIG. 2 is a perspective view partially in section of the rail system of the present invention;
FIG. 3 is a schematic diagram of one embodiment of the invention;
FIG. 4 is a schematic diagram of another embodiment of the invention, and
FIG. 5 is a perspective view partially in section of the means for supporting gas pressure levitation devices in opposed relationship to certain surfaces of the rail system.

Referring now to the drawings in which like reference numerals indicate like parts throughout the several views thereof, there is shown in FIG. 1 a vehicle 10 positioned upon a rail system 11.

As shown in FIG. 2, this rail system may consist of a pair of box-like rails 12 and 13 that are supported from pillars 14 and 15 by means of T sections 16. The pillars 14 and 15 are supported from the ground by means of concrete foundations 17 and 18.

The vehicle 10 is suitable for carrying a number of passengers, and it includes a pair of propellers 20 and 21 positioned at either end thereof for propelling it over the rail system. The vehicle is supported from the rail system by means of a plurality of gas pressure levitation devices that are positioned in opposed relationship to the substantially horizontal portions of the rails 12 and 13.

Referring now to FIG. 3, there is shown a cross sectional view of the preferred embodiment of the invention including the two rails 12 and 13. The rail 12 has a substantially horizontal section or surface 25 having a gas pressure levitation device 26 positioned in substantially opposed relationship thereto and the rail 13 has a substantially horizontal section or surface 27 having a gas pressure levitation device 28 positioned in opposed relationship thereto. These gas pressure levitation devices may be of the type described in copending application S.N. 744,416, filed June 25, 1958, in the names of David J. Jay and Harlan W. Peithman, and assigned to the assignee of the present invention. They include a plenum 31 and a plurality of orifices, certain of which are designated by the numerals 32 and 33. A pipe 34 contains gas under pressure, preferably air under pressure, that may be supplied by means of a compressor (not shown) driven by the power plant (not shown) of the vehicle. A conduit 35 connects the pipe 34 with gas pressure levitation device 26 while a conduit 37 connects the pipe 34 with the gas pressure levitation device 28. Thus, gas under pressure is continually supplied to the gas pressure levitation devices 26 and 28 to support the vehicle from the rail system by means of a gas under pressure.

The present invention provides means for controlling or restricting the lateral movement of the vehicle on the rail system. This means increases the gas or air supply to a gas pressure levitation device that becomes active to restrict the lateral movement of the vehicle when it is subjected to an unbalanced lateral or side load. The preferred embodiment of this means is also shown in FIG. 3, and it includes a gas pressure levitation device 41 positioned in opposed relationship to a surface or section 42 of the rail 12. This section or surface 42 may be positioned in a vertical plane or, as will be described more fully in relation to FIG. 4, it need only have a substantial vertical component. Another gas pressure levitation device 43 is positioned in opposed relationship to a similar surface or section 44 of rail 13. Each of these gas pressure levitation devices has a plenum 45 and a plurality of orifices 46 positioned in a section thereof adjacent the surfaces or sections 42 and 44.

An inertia valve, generally designated by the numeral 51 and including an outer casing 52 and a shuttle piston 53, is positioned within the vehicle 10 so that the longitudinal axes of the casing and the shuttle piston are positioned substantially transversely of the vehicle. Or stated in another way, the axes of the casing and the shuttle piston are disposed substantially perpendicularly to the longitudinal axis of the vehicle and to the axes of the rails 12 and 13. The casing 52 has a pair of end walls 54 and 55 having outlet orifices 56 and 57 positioned therein. The side wall 58 of the casing 52 has a centrally disposed inlet orifice 61 that is connected to pipe 34 by means of conduit 62. The outlet orifice 56 disposed in end wall 54 is connected to gas pressure levitation device 43 by means of a conduit 64 while the outlet 57 positioned in end wall 55 is connected to gas pressure levitation device 41 by means of conduit 63. The shuttle piston 53 is positioned in the center of the casing 52 under conditions of neutral side loading of the vehicle 10 by means of a pair of identical springs 71 and 72 that are positioned against the shuttle piston and the end walls of the casing.

Under conditions of neutral side loading the shuttle piston 53 restricts the flow of air from the pipe 34 to both gas pressure levitation devices 41 and 43. It is preferred that each of these levitation devices be supplied with a small amount of air under pressure at all times and hence a small amount of clearance is provided between the outer diameter of the shuttle piston 53 and the inner diameter of casing 52. This clearance is preferably a few thousandths of an inch and it is shown in exaggerated form in the drawing as an aid to clarity. In addition, this clearance provides air that serves as a lubricant when the shuttle piston moves within the casing. The inertia valve could be constructed, however, so that the shuttle piston 53 would substantially cut off the air supply to these two devices.

When a lateral load is applied to the vehicle, for example, from centrifugal force generated as the vehicle is negotiating a turn, the shuttle piston will move to uncover the inlet orifice 61 and to supply an increased amount of air to one of the gas pressure levitation devices while maintaining the supply of air to the other gas pressure levitation device at its previous value. For example, if the vehicle is negotiating a left turn and it is presumed that the view in FIG. 3 is taken looking toward the front of the vehicle, the shuttle piston 53 will be moved to the right thereby increasing the air supply to the outlet 56 and to gas pressure levitation device 43 by means of conduit 64. The increase in the air supply to gas pressure levitation device 43 will result in an increase in air pressure between the device and the surface 44 of rail 13. This will resist the lateral movement of the vehicle toward this rail. Conversely, if a right hand turn is being negotiated the shuttle piston will move to the left thereby increasing the supply of air to the outlet 57 and to gas pressure levitation device 41 by means of conduit 63. The increase in air pressure between this air pressure levitation device and the surface 42 of rail 12 will resist the lateral movement of the vehicle toward the rail 12.

FIG. 4 discloses another embodiment of the invention in which the vehicle 10 may be supported from a single rail. In this case some type of stabilizing means, for example, a gyroscope, may be employed with the vehicle to maintain stability. In FIG. 4 a rail 81 is shown having a top section 82 and a pair of side sections 83 and 84. A gas pressure levitation device 85 is positioned in opposed relationship to the substantially horizontal surface or section 82 while another gas pressure levitation device 86 is positioned in opposed relationship to the surface 83. A third gas pressure levitation device 87 is positioned in opposed relationship to the surface 84. It can be seen that the rail surfaces 83 and 84, while not disposed vertically, do have a vertical component of substantial area. The inertia valve 51 is of the same construction as that shown in FIG. 3, and a conduit 91 connects the outlet orifice 56 with the gas pressure levitation device 87 while a conduit 92 connects the gas pressure levitation device 86 with outlet orifice 57. The gas pressure levitation device 85 is connected to the supply pipe 34 by means of conduit 93. The operation of the embodiment shown in FIG. 4 is the same as the operation of the embodiment shown in FIG. 3 with the gas pressure levitation device 87 resisting lateral movement of the vehicle when a right hand turn is negotiated and with the gas pressure levitation device 86 resisting lateral movement when a left hand turn is negotiated. In addition, the gas pressure levitation device 86 resists the tendency of the vehicle to lean outwardly during a left hand turn, while the gas pressure levitation device 87 resists the tendency of the vehicle to lean outwardly during a right hand turn.

The air pressure levitation devices may be supported in the vehicle 10 from the supply pipe 34 as shown in FIG. 5. In FIG. 5, a pair of collars 101 and 102, are affixed to the supply pipe 34 which may form a longitudinal structural member of the vehicle. A frame member 103 may be supported from the collars 101 and 102 by a pair of torsion bars, one of which is shown at 104. The air pressure levitation devices are supported from the frame 103 by means of gimbals. For example, air pressure levitation device 28 is supported from the frame member 103 in opposed relationship to the substantially horizontal surface 27 of the rail 13 by means of gimbals 105 and 106. The air pressure levitation devices positioned in opposed relationship to the substantially vertical surfaces of the rails may be similarly supported by gimbals. For example, as shown here, the air pressure levitation device 43 is supported from the frame member 103 by gimbals 108. The conduits 37 and 35 for supplying air under pressure to the air pressure levitation devices 26 and 28 are also shown. This type of a suspension system or supporting system for the air pressure levitation devices is more fully described and is claimed in copending application S.N. 162,901, filed December 28, 1961, in the name of David J. Jay, and assigned to the assignee of this invention. It is to be understood that the support system for the air pressure levitation devices of this invention is not restricted to this type of system, but that this type of system is shown for illustrative purposes.

FIGS. 3 and 4 disclose only one grouping of gas pressure levitation devices disposed in a vehicle, but it is to be understood that a plurality of such groupings would ordinarily be employed spaced along the length of the vehicle. One or more inertia valves may be employed with these to control the supply of gas to those gas pressure levitation devices that are active in controlling the lateral movement of the vehicle.

The present invention thus provides a means for resisting the lateral loads applied to a vehicle supported by gas under pressure that conserves the gas supply of the vehicle.

It will be understood that the invention is not to be limited to the exact construction shown and described, but that various changes and modifications may be made without departing from the spirit and scope of the invention as defined in the appended claims.

I claim:

1. In a mechanism for counteracting lateral loads on a vehicle supported from a rail system by gas under pressure, the combination comprising, a source of gas under pressure carried by said vehicle, a gas pressure levitation device supported by said vehicle in opposed relationship to a surface of the rail system, said surface having a substantial verticle component, and means carried by said vehicle and connecting said source of gas under pressure and said gas pressure levitation device for increasing the gas supply to said gas pressure levitation device in response to lateral loads on the vehicle that tend to move said gas pressure levitation device toward said surface.

2. In a mechanism for counteracting the lateral loads on a vehicle supported from a rail system by gas under pressure, the combination comprising, a source of gas under pressure carried by said vehicle, a gas pressure levitation device supported by said vehicle in opposed relationship to a surface of the rail system having a substantial vertical component, an inertia valve carried by said vehicle and having a casing, said casing having an inlet connected to said source of gas under pressure and an outlet connected to said gas pressure levitation device, a shuttle piston positioned in said casing, spring means engaging said piston and said casing for positioning said shuttle piston to restrict gas flow through said casing to said gas pressure levitation device under conditions of neutral lateral loads and for permitting said piston to move in a direction to increase the gas supply to said gas pressure levitation device when lateral loads are applied to the vehicle tending to move the gas pressure levitation device toward said surface.

3. In a mechanism for counteracting lateral loads on a vehicle supported from a rail system by gas under pressure, the combination comprising a source of gas under pressure carried by said vehicle, a first gas pressure levitation device supported by said vehicle in opposed relationship to a first surface of the rail system having a substantial vertical component, a second gas pressure levitation device supported by said vehicle in opposed relationship to a second surface of the rail system having a substantial vertical component, and means carried by said vehicle and connected to said source of gas under pressure and to said first and second gas pressure levitation devices for selectively increasing the supply of gas to one of said gas pressure levitation devices in response to lateral forces applied to the vehicle.

4. In a mechanism for controlling the lateral movement of a vehicle supported from a rail system by gas under pressure, the combination comprising, a source of gas under pressure carried by said vehicle, a first gas pressure levitation device supported by said vehicle in opposed relationship to a first surface of the rail system having a substantial vertical component, a second gas pressure levitation device supported by said vehicle in opposed relationship to a second surface of the rail system having a substantial vertical component, an inertia valve carried by said vehicle and having a casing, said casing having an inlet connected to said source of gas under pressure, a first outlet connected to said first gas pressure levitation device and a second outlet connected to said second gas pressure levitation device, a shuttle piston positioned in said casing, the axes of said casing and said shuttle piston being disposed substantially transversely in the vehicle, spring means positioned within said casing and engaging said shuttle piston for positioning said shuttle piston to restrict gas flow through said casing and to said gas pressure levitation devices under conditions of neutral lateral loads and for permitting said piston to move in a direction to increase the gas supply to either said first gas pressure levitation device or to said second gas pressure levitation when lateral loads are applied to the vehicle, the direction of movement of said shuttle piston depending upon the direction of the lateral loads.

5. A high speed transportation system comprising a vehicle, a rail system including a substantially horizontal surface, a gas pressure levitation device affixed to said vehicle in opposed relationship to said substantially horizontal surface, gas supply means carried by said vehicle and connected to said gas pressure levitation device for continuously supplying said gas pressure levitation device with gas under pressure, said rail system having a second and third surface each having a substantial vertical component, a second gas pressure levitation device affixed to said vehicle in opposed relationship to said second surface, a third gas pressure levitation device affixed to said vehicle in opposed relationship to said third surface, and means carried by said vehicle and connected to said gas supply means and to said second and third gas pressure levitation devices for selectively increasing the supply of gas to one of said devices in response to unbalanced lateral forces applied to the vehicle.

6. A high speed transportation system comprising a pair of spaced rails, each of said rails having a substantially horizontal surface and a substantially vertical surface, the substantially vertical surface of one rail being positioned to face the substantially vertical surface of the other rail, a vehicle positioned upon said rails, said vehicle having a source of gas under pressure, means carried by said vehicle and connected to said source of gas under pressure for continuously supplying a thin layer of gas under pressure between said means and said substantially horizontal surface, a second means positioned adjacent the substantially vertical surface of one of said rails for supplying a thin film of gas under pressure between said means and said substantially vertical surface of one of said rails, a third means positioned adjacent the substantially vertical surface of the other of said rails for supplying a thin film of gas under pressure between said means and said substantially vertical surface of the other of said rails, and valve means connecting said second and third means with said source of gas under pressure for substantially increasing the air supply to one of said means when the vehicle is subjected to lateral acceleration forces.

7. A high speed transportation system comprising a pair of spaced rails, each of said rails having a substantially horizontal surface and a substantially vertical surface, the substantially vertical surface of one rail being positioned to face the substantially vertical surface of the other rail, a vehicle positioned upon said rails, said vehicle having a source of gas under pressure, means carried by said vehicle and connected to said source of gas under pressure for continuously supplying a thin layer of gas under pressure between said means and said substantially horizontal surface, a second means positioned adjacent the substantially vertical surface of one of said rails for supplying a thin film of gas under pressure between said means and said substantially vertical surface of one of said rails, a third means positioned adjacent the substantially vertical surface of the other of said rails for supplying a thin film of gas under pressure between said means and said substantially vertical surface of the other of said rails, and valve means connecting said second and third means with said source of gas under pressure for continuously supplying said second and third means with a selected amount of air under pressure and for substantially increasing the air supply to one of said means when the vehicle is subjected to lateral acceleration forces.

8. In a mechanism for counteracting lateral loads on a vehicle supported from a rail system by gas under pressure, the combination comprising a source of gas under pressure, a first gas pressure levitation device positioned in opposed relationship to a first surface of the rail system, said first surface having a substantial vertical projection, a second gas pressure levitation device positioned in opposed relationship to a second surface of the rail system, said second surface having a substantial vertical projection, an inertia valve positioned within said vehicle, said inertia valve including a casing having spaced end walls and an interconnecting side wall, a shuttle piston disposed within said casing, a first spring engaging one of said end walls and one side of said shuttle piston and a second spring engaging one of said end walls and the other side of said shuttle piston for positioning said shuttle piston in the center of said casing, the axis of said casing and said shuttle piston being disposed transversely with respect to the longitudinal axis of the vehicle, a gas inlet positioned centrally in the side wall of said casing and connected to said source of gas under pressure, a first gas outlet positioned in one end wall of the casing and connected to the first gas pressure levitation device, and a second gas outlet positioned in the other end wall of said casing and connected to the second gas pressure levitation device, whereby said shuttle piston is maintained in a central position over said air supply inlet when the lateral loads on the vehicle are in balance and moves to one side of the casing for substantially increasing the air supply to one of said gas pressure levitation devices when the vehicle is subjected to unbalanced lateral loads.

References Cited in the file of this patent

UNITED STATES PATENTS

| | | |
|---|---|---|
| 2,511,979 | Goddard | June 20, 1950 |
| 2,985,114 | Linder | May 23, 1961 |
| 3,013,505 | Burke | Dec. 19, 1961 |

FOREIGN PATENTS

| | | |
|---|---|---|
| 1,238,499 | France | July 4, 1960 |